United States Patent
Laveault et al.

(10) Patent No.: US 7,299,950 B2
(45) Date of Patent: Nov. 27, 2007

(54) DISPENSING APPARATUS

(75) Inventors: Richard A. Laveault, Ft. Wayne, IN (US); Brian R. Law, Liecester (GB); Stephen E. Stalions, Ft. Wayne, IN (US)

(73) Assignee: Rieke Corporation, Auburn, IN (US)

( * ) Notice: Subject to any disclaimer, the term of this patent is extended or adjusted under 35 U.S.C. 154(b) by 572 days.

(21) Appl. No.: 10/934,292

(22) Filed: Sep. 3, 2004

(65) Prior Publication Data

US 2006/0049214 A1    Mar. 9, 2006

(51) Int. Cl.
*B67D 5/64* (2006.01)
(52) U.S. Cl. ............ 222/174; 222/153.11; 222/153.13; 222/402.1; 222/473
(58) Field of Classification Search ............. 222/402.1, 222/174, 402.11, 402.13, 473–474, 402.15, 222/153.01, 153.11, 153.13, 153.14, 182, 222/153.04
See application file for complete search history.

(56) References Cited

U.S. PATENT DOCUMENTS

| | | | |
|---|---|---|---|
| 1,895,693 A | 1/1933 | Tracy | |
| 1,960,738 A | 5/1934 | Giezentanner | 47/49 |
| 2,206,053 A | 7/1940 | Schroeder | 47/49 |
| 2,296,500 A | 9/1942 | Cain | 47/49 |
| 2,577,687 A | 12/1951 | Lee | 222/322 |
| 2,659,918 A | 11/1953 | Stoner | 15/131 |
| 2,720,422 A * | 10/1955 | Mercur | 222/174 |
| 2,817,189 A | 12/1957 | Esmay | 47/1 |
| 2,821,048 A | 1/1958 | Efford et al. | 47/1 |
| 3,013,699 A | 12/1961 | Meuwly | 222/174 |
| 3,017,056 A * | 1/1962 | Bishop | 222/164 |
| 3,485,206 A | 12/1969 | Smirt | 118/305 |
| 3,679,319 A * | 7/1972 | Munchel et al. | 401/138 |

(Continued)

FOREIGN PATENT DOCUMENTS

CA          908107          8/1972

(Continued)

OTHER PUBLICATIONS

EPO Search Report dated Dec. 29, 2005 from EP 05254109.1 filed Aug. 30, 2005.

(Continued)

*Primary Examiner*—Frederick C. Nicolas
(74) *Attorney, Agent, or Firm*—Woodard, Emhardt, Moriarty, McNett & Henry LLP (57) ABSTRACT

A product-dispensing apparatus for manually dispensing a quantity of product, such as a herbicide with a foam consistency, includes a gripping member in the form of a handle and a cooperating container holder that is assembled with the gripping member and is constructed and arranged to receive a product-dispensing container. The container is preferably a foamer positioned in an inverted orientation utilizing a depressing plunger to dispense a foam-consistency product. The gripping member and container holder are assembled to a dispensing tip such that there is relative movement between the container holder and the dispensing tip for activation of the container plunger. A child-resistant locking ring is received by the container holder and cooperates with the dispensing tip for alternately configuring the product-dispensing apparatus in either a locked or unlocked condition. In the locked condition, foam product is not able to be dispensed from the container.

24 Claims, 10 Drawing Sheets

U.S. PATENT DOCUMENTS

| | | | |
|---|---|---|---|
| 3,716,195 A | 2/1973 | Silva | 239/375 |
| 3,794,217 A * | 2/1974 | Muchel | 222/174 |
| 4,089,440 A | 5/1978 | Lee | 222/174 |
| 5,216,833 A | 6/1993 | Longer | 47/1.5 |
| 5,307,959 A * | 5/1994 | Bedore et al. | 222/174 |
| 5,518,148 A | 5/1996 | Smrt | 222/174 |
| 5,779,155 A | 7/1998 | Schennum et al. | 239/333 |
| 6,250,830 B1 | 6/2001 | Clark | 401/48 |
| 6,390,336 B1 | 5/2002 | Orozco | 222/162 |
| 6,663,307 B2 | 12/2003 | Kopanic et al. | 401/190 |
| 2003/0196585 A1 | 10/2003 | McDonald et al. | 116/211 |

FOREIGN PATENT DOCUMENTS

WO   WO 03/026413   4/2003

OTHER PUBLICATIONS

EPO Search Report dated Feb. 24, 2006 from EP 05254109.1 filed Jun. 30, 2005.

* cited by examiner

DISPENSING APPARATUS

BACKGROUND OF THE INVENTION

The present invention relates generally to dispensing apparata that are used to dispense a solution or product from a storage container by the use of a hand-held device connected with or receiving the storage container in some fashion. More specifically, the present invention relates to the dispensing of a foam product, such as a herbicide or weed killer, from a foamer container that is connected at a distal end of an elongated hand-held carrier. A telescoping configuration, movable in an axial or longitudinal direction, is used to activate release of the foam product by means of a movable plunger nozzle.

With regard to the broad category of devices that is likely the closest to the present invention, this category would include, as one example, devices where the herbicide or other solution or product is contained in some interior cavity or interior container and is dispensed from the device via a passageway connecting to the interior cavity. This broad category of device also includes those structures and apparata where the herbicide or other solution or product is provided as part of some external package, such as an aerosol can. Another example of this broad category of device includes those apparata that incorporate a telescoping plunger such that the herbicide or other solution or product is dispensed from within a hollow tube.

Although there are believed to be several examples of devices corresponding to each of the three species of this broad category, as described above, none of these devices or species combine the use of an external container and the use of a telescoping plunger mechanism to activate the release of the product stored within the container. By positioning the product container external to the hand-held plunger stick, greater design versatility is provided. It is also easier to accommodate a greater variety of product containers. A further benefit of the present invention is the ability to include a child-resistant feature; important when dispensing a herbicide. While the telescoping plunger mechanism is a simple and efficient design, by linking it to the product container, design modifications are easier to incorporate and it is easier to repair and/or replace component parts. These features of the present invention will be understood from the description of the preferred embodiment.

Additional features of the present invention include the use of a foamer for the product container with a "suck back" feature, and the ability to make the product container (with a pump mechanism) disposable. All of these features are believed to be novel and unobvious in the context of the present invention.

SUMMARY OF THE INVENTION

A product-dispensing apparatus for manually dispensing a quantity of product from within a container according to one embodiment of the present invention comprises a gripping member, a container holder assembled with the gripping member and being constructed and arranged to receive the container, a dispensing tip assembled with the container holder, and a locking ring received by the container holder and cooperating with the dispensing tip for alternately configuring the product-dispensing apparatus in either a locked or unlocked condition wherein, while in the locked condition, the product-dispensing apparatus is not operable to cause product to be dispensed.

One object of the present invention is to provide an improved product-dispensing apparatus for manually dispensing a quantity of product.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1-6, there is illustrated a product-dispensing apparatus 20 that is constructed and arranged according to the teachings of the present invention. Apparatus 20 includes a handle 21, a connecting tube assembly 22, a container holder 23, a dispensing tip 24, and a child-resistant locking ring 25. The connecting tube assembly 22 includes three hollow tube sections 22a, 22b, and 22c. These three tube sections are press fit together so as to create a single component part extending from handle 21 to container holder 23. In the preferred embodiment, each of the end sections 22a and 22c includes a smaller diameter insert portion that is received by the larger diameter ends of center section 22b, with the described press fit. For simplicity with the description that follows, this three tube section assembly will be referred to as "connecting tube 22".

The gripping handle 21 includes four concave gripping recesses 26 and is securely assembled, by insertion, into the proximal, open end of connecting tube 22. The opposite, distal end 27 of connecting tube 22 is inserted with a press fit into the tubular sleeve portion 28 of container holder 23. This press fit is designed so that the connecting tube 22 and the tubular sleeve portion 28 remain securely connected during use of apparatus 20. Shoulder 29 provides an abutment surface that controls or limits the insertion depth of connecting tube 22 into tubular sleeve portion 28. The lower, distal end 30 of tubular sleeve portion 28 is inserted into the upper, open end 31 of dispensing tip 24. The child-resistant locking ring 25 is positioned around the tubular sleeve portion 28, beneath the location of shoulder 29.

The gripping handle 21 is fabricated from two similarly configured and molded halves 21a and 21b, namely a right half and a left half, that are securely and integrally joined together into the finished handle 21 that is illustrated. The dividing line 21c for these two halves is longitudinal in direction and extends through each of the four gripping recesses 26. The joining technique for the two halves comprising gripping handle 21 is preferably ultrasonic welding, but alternatively, adhesive can be used.

Figure 20:
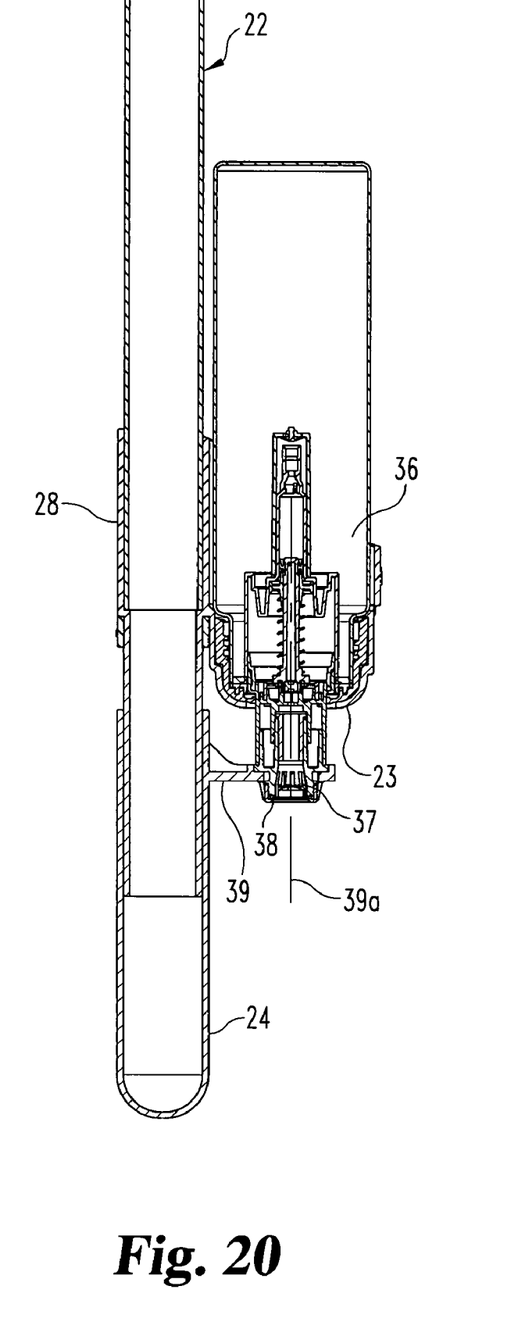
FIG. 20 is a side elevational view, in full section, illustrating the FIG. 1 product-dispensing apparatus in combination with a product container.

The container holder 23 includes a recessed, annular pocket 35 that is constructed and arranged to receive the body of a dispensing container 36, see FIG. 20. Container 36 is constructed and arranged to dispense a foam product, such as a herbicide. In order to dispense a quantity of foam herbicide, the nozzle 37 must be pushed axially inwardly toward the body of container 36 in order to activate a spring-biased plunger mechanism in a manner generally known in the art for foam dispensing containers. The end 38 of nozzle 37 is received by the adapter portion 39 of dispensing tip 24. As will be described in greater detail herein, when the dispensing tip 24 and container holder 23 telescopingly move closer together, the adapter portion 39 and the pocket 35 move closer together. In order to facilitate the cooperation between the container holder 23 and dispensing tip 24, the axial centerline 39a of adapter portion 39 is coaxial with the axial centerline 40a of opening 40. This causes the nozzle 37 to be pushed axially inwardly and a quantity of foam herbicide is dispensed from the end 38 of nozzle 37 onto the surface or object, such as a weed, that is directly below adapter portion 39.

Figure 1:
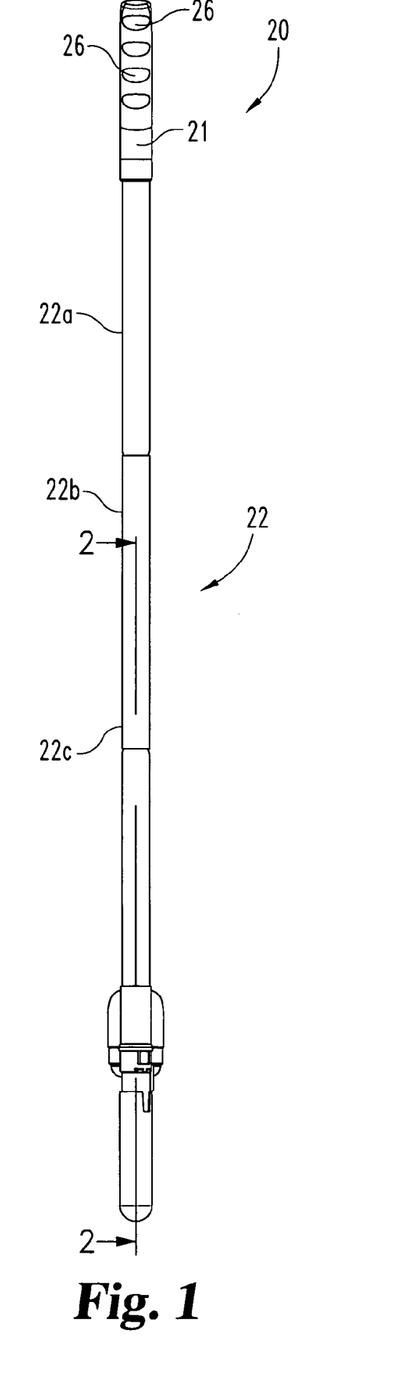
FIG. 1 is front elevational view of a product-dispensing apparatus according to a typical embodiment of the present invention.
Figure 2:
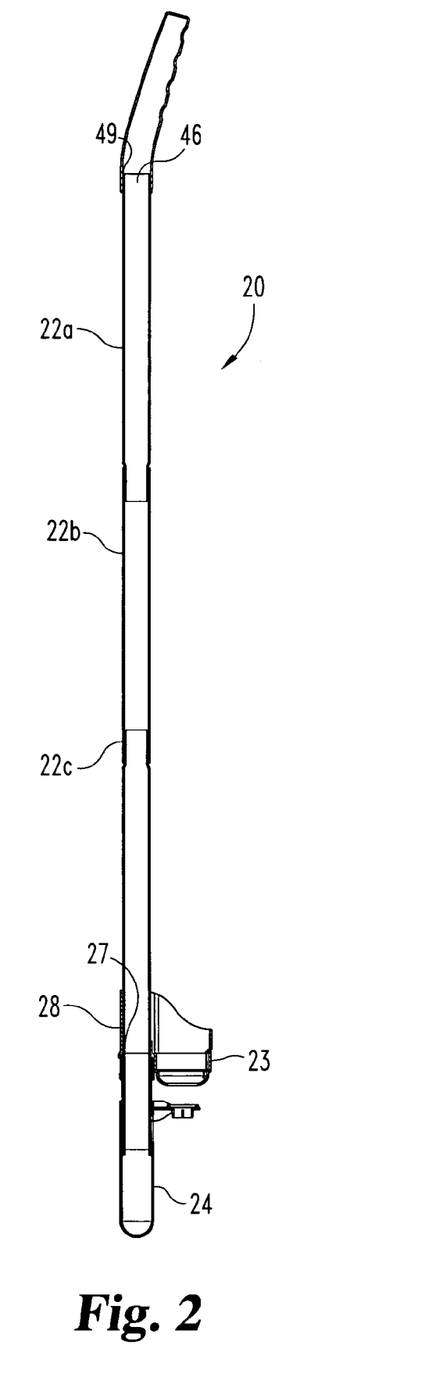
FIG. 2 is a side elevational view, in full section, of the FIG. 1 product-dispensing apparatus.
Figure 3:
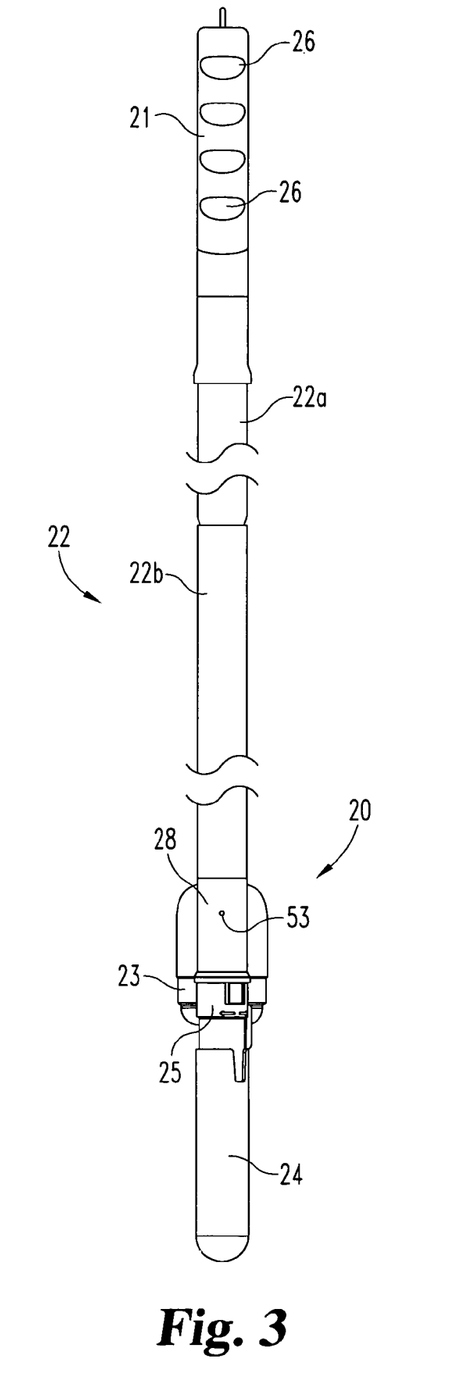
FIG. 3 is a partial, front elevational view of the FIG. 1 product-dispensing apparatus showing the lower portion.
Figure 4:
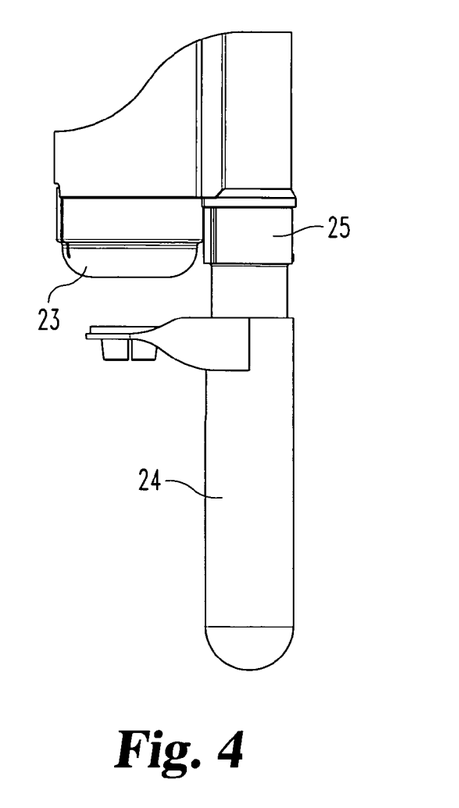
FIG. 4 is a side elevational view of the FIG. 3 structure.
Figure 5:
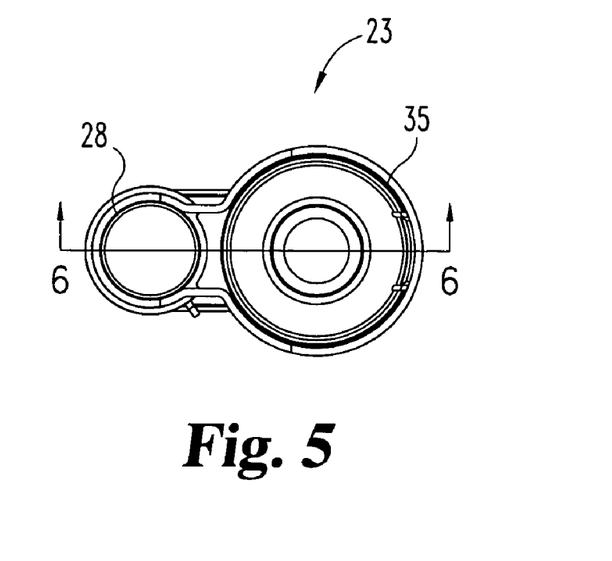
FIG. 5 is a top plan view of the FIG. 4 structure.
Figure 6:
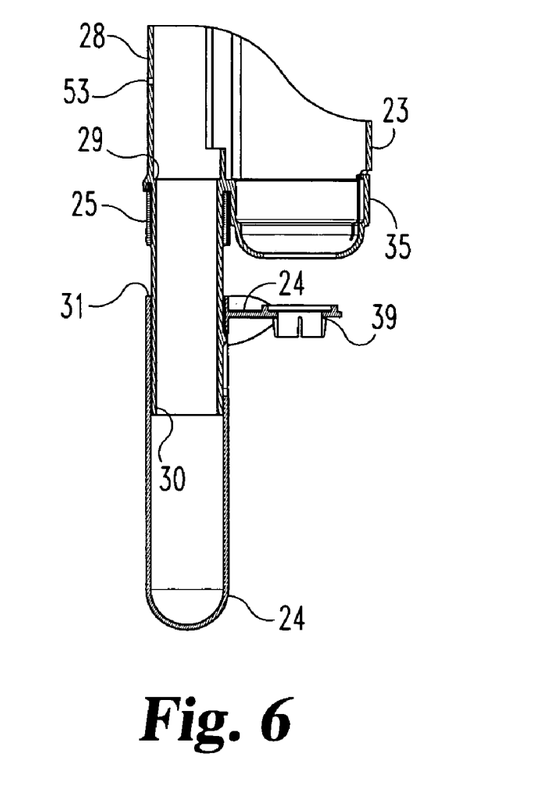
FIG. 6 is a side elevational view, in full section, of the FIG. 3 structure as viewed along line 6-6 in FIG. 5.
Figure 7:
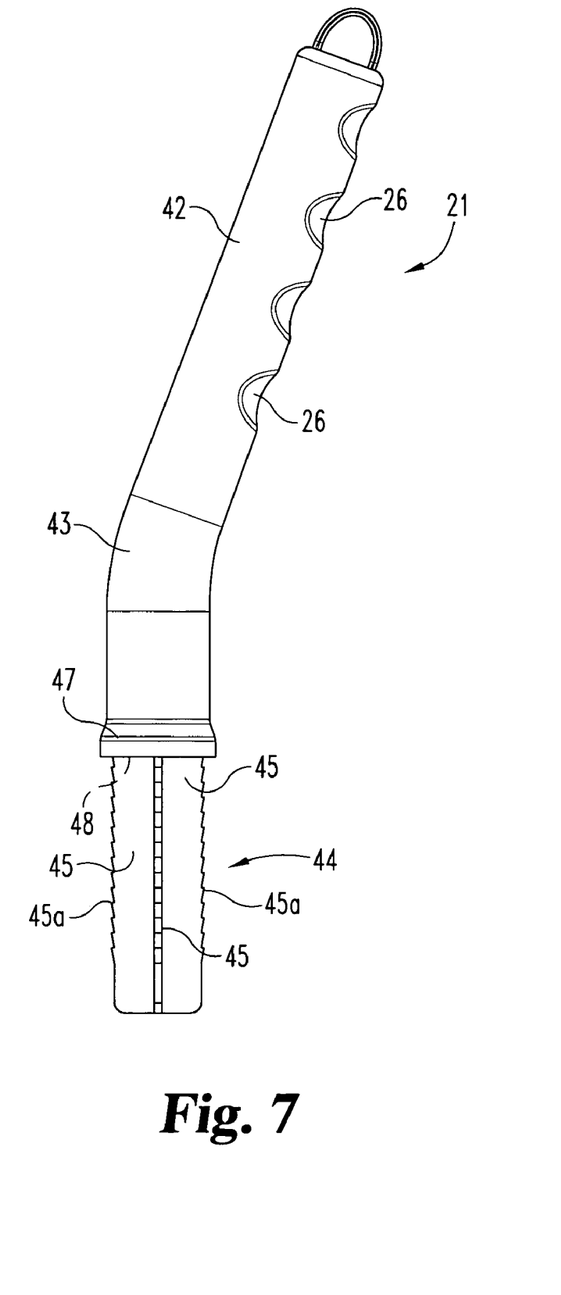
FIG. 7 is a side elevational view of a handle comprising one portion of the FIG. 1 product-dispensing apparatus.
Figure 7A:
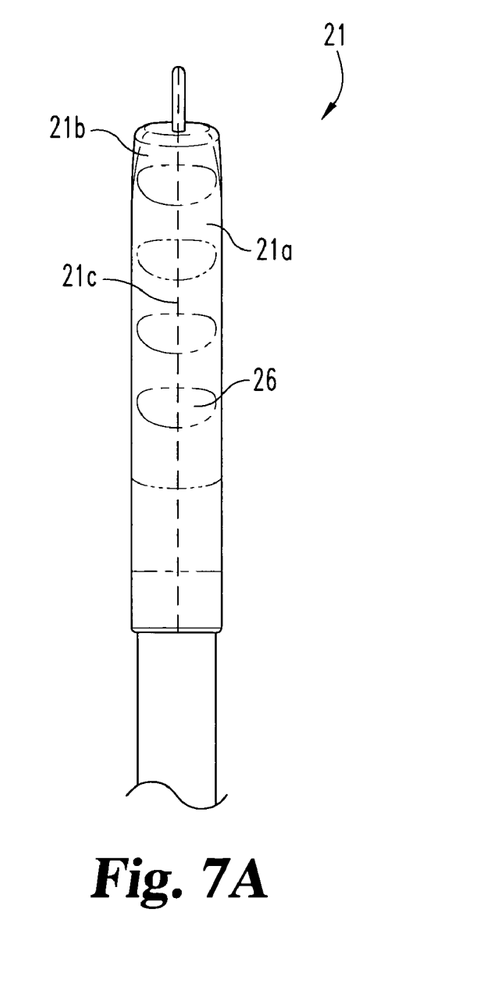
FIG. 7A is a partial, rear elevational view of the FIG. 7 handle.
Figure 8:
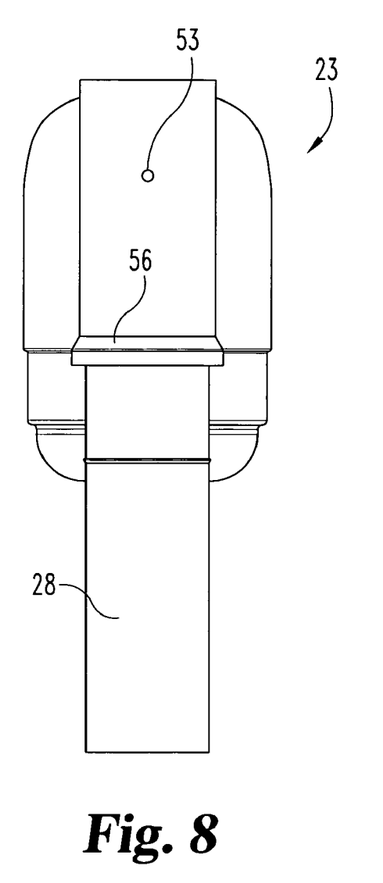
FIG. 8 is a front elevational view of a container holder comprising one portion of the FIG. 1 product-dispensing apparatus.
Figure 9:
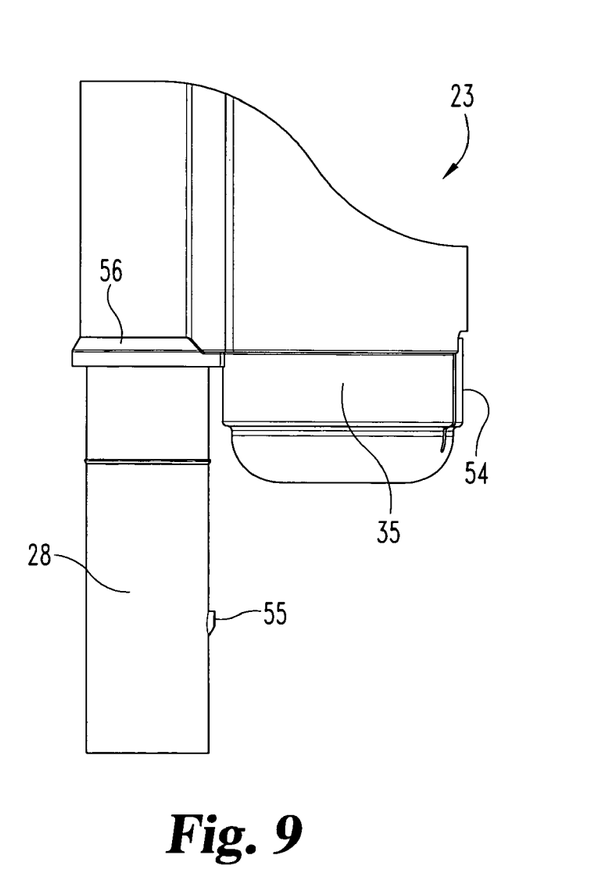
FIG. 9 is a side elevational view of the FIG. 8 container holder.
Figure 10:
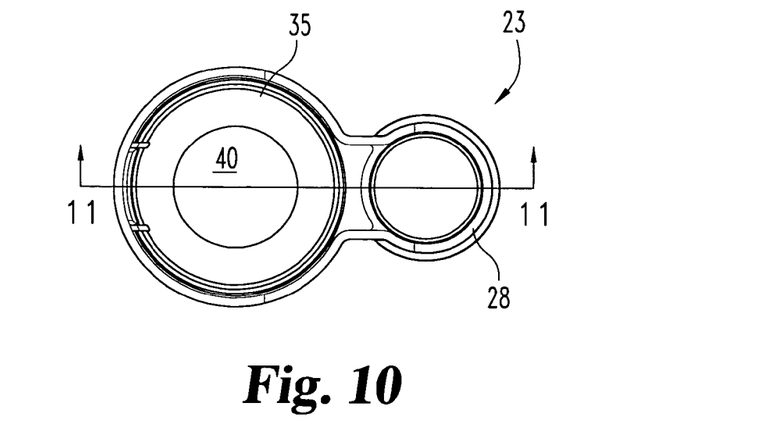
FIG. 10 is a top plan view of the FIG. 9 container holder.
Figure 11:
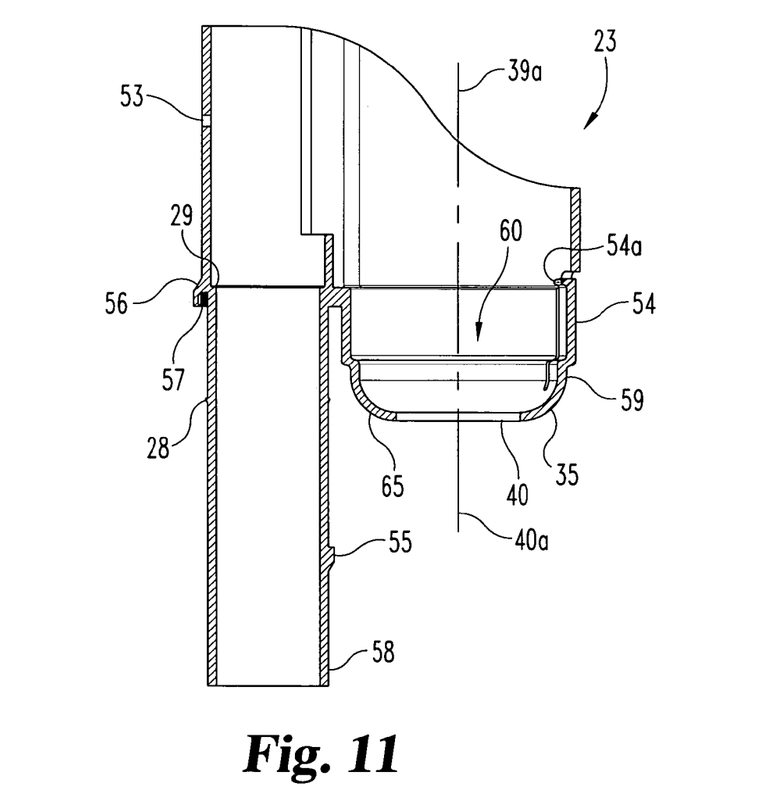
FIG. 11 is a side elevational view, in full section, of the FIG. 8 container holder as viewed along line 11-11 in FIG. 10.
Figure 12:
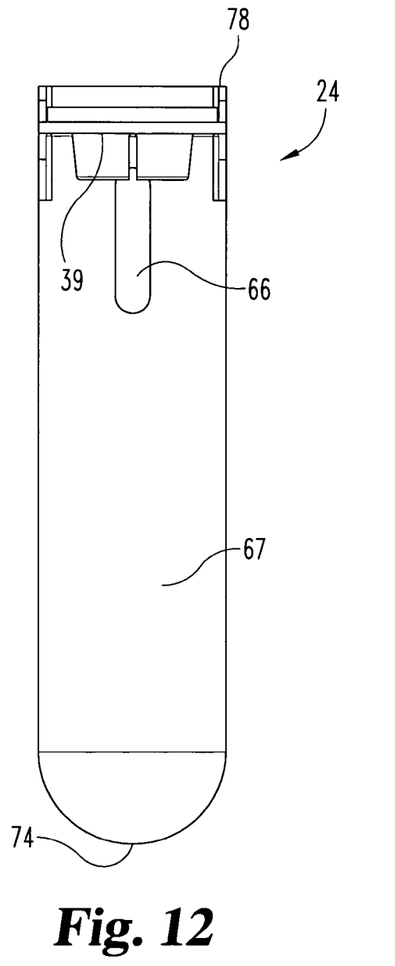
FIG. 12 is a front elevational view of a dispensing tip comprising one portion of the FIG. 1 product-dispensing apparatus.
Figure 13:
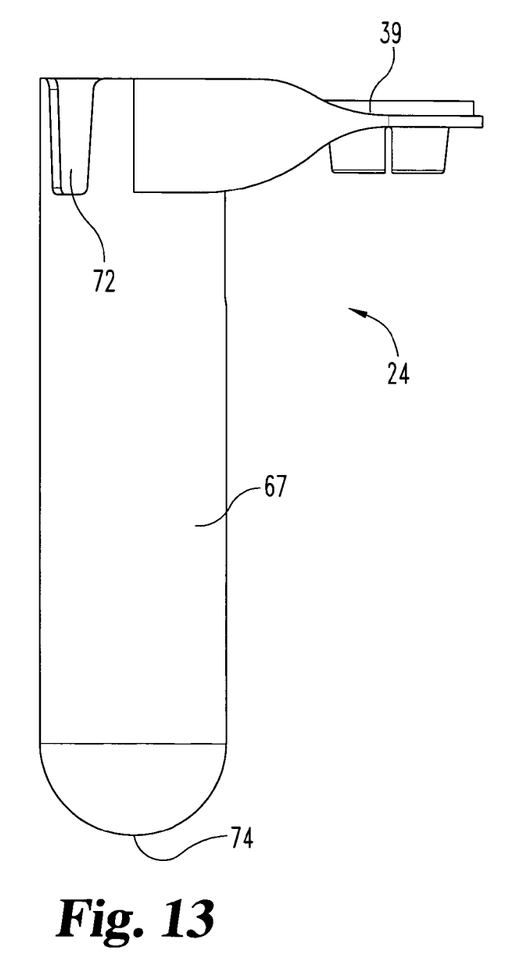
FIG. 13 is a side elevational view of the FIG. 12 dispensing tip.
Figure 14:
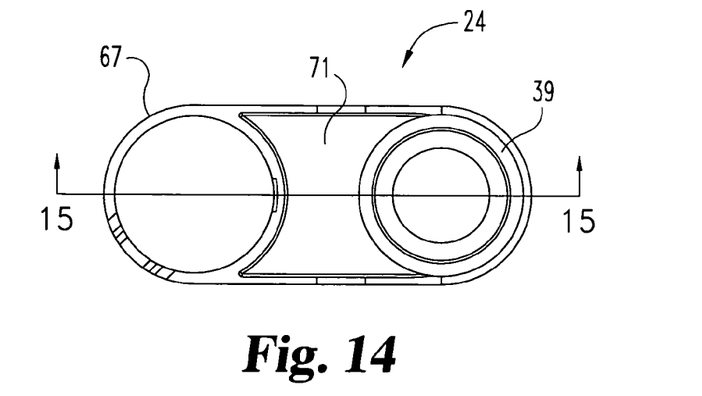
FIG. 14 is a top plan view of the FIG. 13 dispensing tip.
Figure 15:
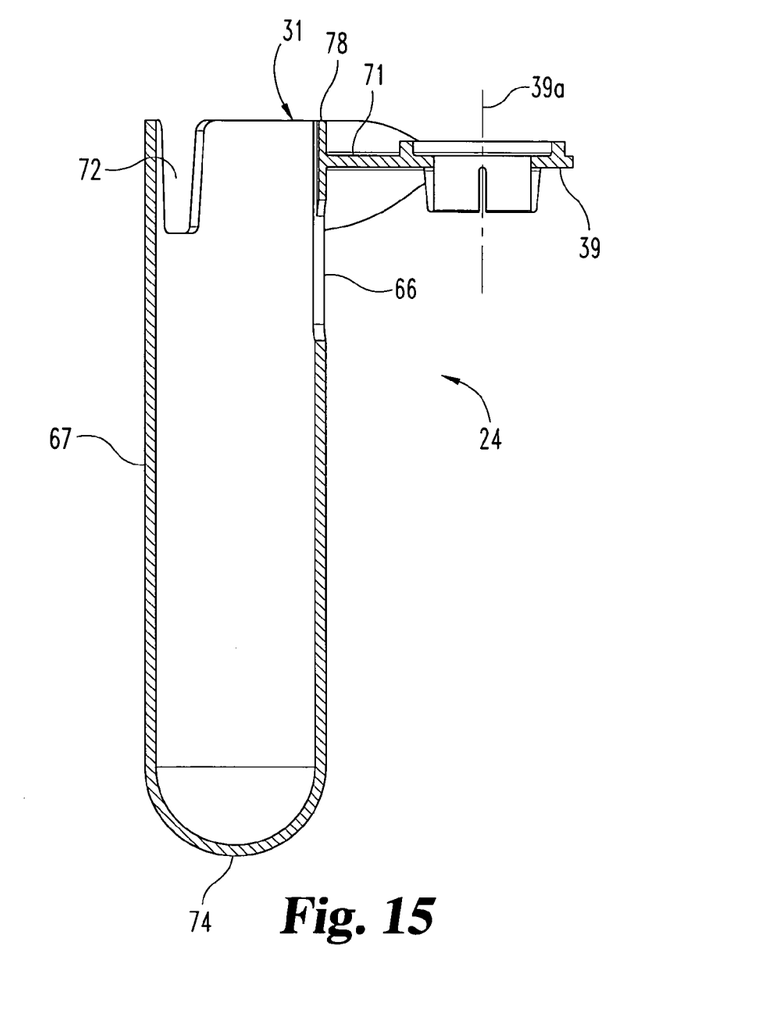
FIG. 15 is a side elevational view, in full section, of the FIG. 12 dispensing tip as viewed along line 15-15 in FIG. 14.
Figure 16:
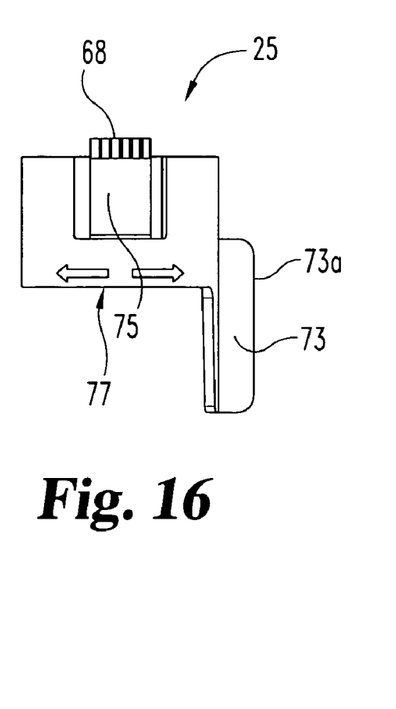
FIG. 16 is a front elevational view of a child-resistant locking ring comprising a portion of the FIG. 1 product-dispensing apparatus.
Figure 17:
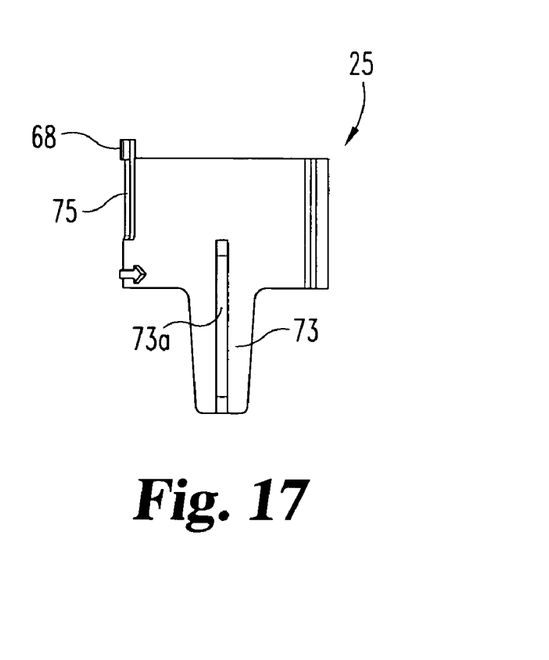
FIG. 17 is a side elevational view of the FIG. 16 child-resistant locking ring.
Figure 18:
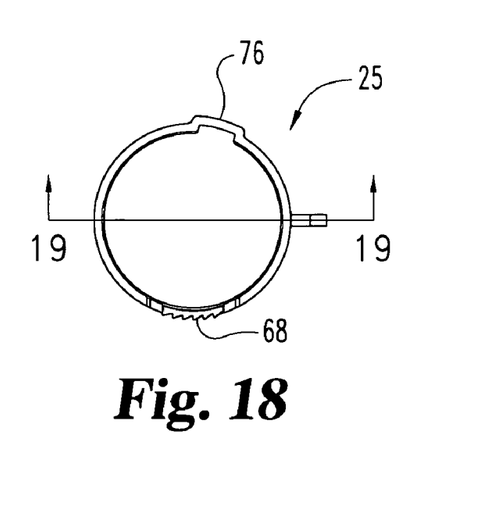
FIG. 18 is a top plan view of the FIG. 17 child-resistant locking ring.
Figure 19:
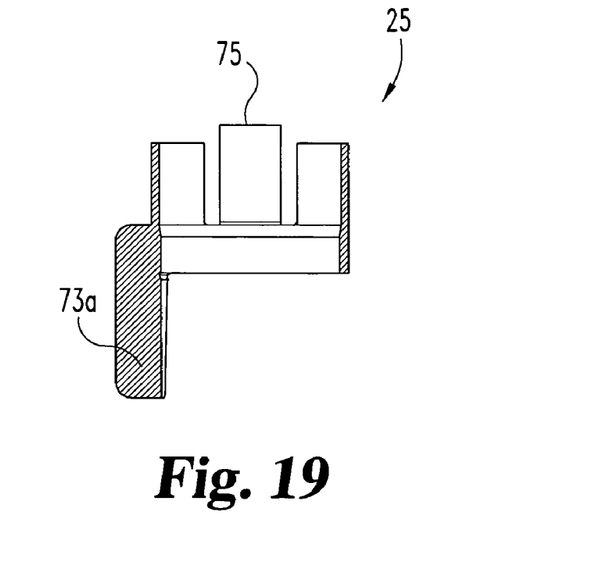
FIG. 19 is a side elevational view, in full section, of the FIG. 16 child-resistant locking ring as viewed along line 19-19 in FIG. 18.

Referring now to the individual component parts of apparatus 20, the handle 21 is illustrated in FIGS. 7 and 7A. FIGS. 8-11 illustrate the details of the container holder 23. FIGS. 12-15 illustrate the details of the dispensing tip 24. FIGS. 16-19 illustrate the details of the child-resistant locking ring 25.

With reference to FIGS. 7 and 7A, handle 21 includes a gripping portion 42 with a spaced-apart series of finger recesses 26. A bend 43 separates the gripping portion 42 from the insertion portion 44. The insertion portion 44 is constructed and arranged with a cruciform series of four blades 45, each with a sawtooth outer edge 45a. Handle halves 21a and 21b are each preferably injection molded out of high density polyethylene as a unitary member. This material provides a certain degree of flexibility, albeit slight, to each of the four blades 45. This enables insertion portion 44 to be forced into the proximal, open end 46 of connecting tube 22.

The direction of incline of each tooth of the sawtooth edge causes the blades to be more readily insertable into end 46 as compared to being removable. Since it is difficult to remove insertion portion 44 from connecting tube 22, these two components are designed to remain together after the initial assembly. This is typical of what would be assumed from a one-directional type of fitting, consistent with the use of a sawtooth or ratchet tooth outer edge. Shoulder 47 defines a recessed annular channel 48 that receives the upper annular edge 49 of connecting tube 22. This fitting helps to prevent any moisture or debris from getting into the hollow interior of connecting tube 22.

Referring now to FIGS. 8-11, container holder 23 includes, in addition to tubular sleeve portion 28, shoulder 29 and annular pocket 35, a securing pin hole 53, release tab 54, raised anchoring bump 55, and collar 56 that defines a small series of ratchet teeth 57. The anchoring bump 55 is formed as a radially outwardly extending protrusion. Sleeve portion 28 is generally cylindrical and enclosed from the location of shoulder 29 to the distal end 58. Above shoulder 29, except for a small section that is adjacent pocket 35, the tubular sleeve portion is open along the side adjacent to or facing pocket 35.

The securing pin hole 53 in tubular sleeve portion 28 is provided as a design option in the event there is a desire to additionally secure the connecting tube 22 in position. While the preferred design is to a have a press-in interference fit between the connecting tube 22 and the tubular sleeve portion 28, if that connection does not provide the desired rigidity, the pin hole 53 can be used. The preferred use for this pin hole is to use it as a pilot hole for creating a pinned connection or for the use a threaded fastener. It is envisioned that the pin hole 53 can be provided as a relatively small diameter opening and simply drilled out for a larger hole, depending on the preferred method of connection.

Release tab 54 is unitarily hinged to the body 59 of pocket 35 so as to be movable at its upper end in terms of deflecting. It is body 59 that defines the open interior space 60 that receives the foamer container 36, see FIG. 20. The innermost portion of release tab 54 is constructed and arranged with a small tip 54a that is used to secure the product-dispensing container 36. As the inverted product-dispensing container is inserted into the recessed pocket 35, allowing the nozzle 37 to extend into the adapter portion 39, a small annular lip that is part of the container snaps below the small tip 54a. Tip 54a holds the container 36 in its received orientation by overlapping the lip and biasing the container in a downward direction. When it is desired to remove the container 36, the user grasps the uppermost end of the container and pulls upwardly, in a direction away from pocket 35 and toward handle 21. With a sufficient pulling force, the container lip pushes against tip 54a, causing release tab 54 to hinge or pivot in a radially outward direction. As the release tab 54 deflects, the tip 54a moves out of engagement with the container lip. This then frees the container for removal from the pocket 35.

This simple and effective assembly and release arrangement facilitates the quick and simple exchange or replacement of roamer product containers. Since one product may need to be replaced by another product for a different application, and since in other situations the product may be exhausted before the application or treatment is completed, it is helpful to have a design that enables a quick and simple changeover.

The bottom wall 65 defines opening 40 in the center so that the nozzle of the selected foamer container can extend therethrough for receipt by the adapter portion 39 of dispensing tip 24. In this inverted orientation, with the foamer container 36 secured into the annular pocket 35, downward movement of the container holder 23, with the dispensing tip 24 pressing against the ground or similar surface, causes the foamer container nozzle to be axially pushed toward or into the container body. The internal plunger mechanism of the foamer container is activated with the initiation of this stroke and, during the full-stroke cycle, a predetermined quantity of foam product is dispensed from the tip or end of the nozzle. Lifting up on the handle 21 allows the spring return within the foamer container to push against the nozzle and return it to the ready position. As the nozzle pushes against the adapter portion 39, the distance of separation between the annular pocket 35 and adapter portion 39 returns to its normal or ready position.

The bump 55 is constructed and arranged to fit within a closed-ended oblong slot 66 that is defined by the tubular body portion 67 of dispensing tip 24. As the distal end 58 of sleeve portion 28 is inserted into body portion 67, having the right amount of telescoping overlap is important. It is also important to keep the sleeve portion 28 from pulling out of body portion 67. When raised bump 55 reaches slot 66, it snaps into slot 66 and this secures these two components together. When lifting up on the handle 21, the container holder 23 pulls away from the dispensing tip 24 as the plunger spring creates a force pushing dispensing tip 24 away. At the end of the plunger stroke for the foamer container, the apparatus is ready for another dispensing cycle. As the apparatus is held up by hand, there is nothing else that retains the dispensing tip 24 connected with the container holder 23, except for the interfit and abutment of bump 55 within and against the upper closed end of oblong slot 66.

Collar 56 is constructed and arranged with a series of ratchet teeth 57 that are configured to interfit with a similarly configured series of ratchet teeth 68 that are formed as part of child-resistant locking ring 25. When the child-resistant locking ring is turned so as to position it in the locking orientation, the two series of ratchet teeth are engaged with each other. In this orientation, the locking ring 25 cannot be turned until the ratchet tooth engagement is released. This release is effected manually, but while manually released, the child-resistant locking ring must be turned to position it in an unlocked orientation. This means that two specific manual manipulations must be performed concurrently in order to release the locking ring 25 from a "locked" condition. Behavioral studies reveal that two manipulations of this type are not likely to be performed concurrently by small children. As a result, this feature provides a child-resistant capability to the overall design of apparatus 20.

Referring now to FIGS. 12-15, dispensing tip 24 includes, in addition to open end 31, adapter portion 39, body portion 67 and closed oblong slot 66, a connecting arm 71 that unitarily joins the adapter portion 39, the body portion 67 and an open-ended tapered slot 72 for receipt of the abutment tab 73 of the child-resistant locking ring 25 when "unlocked". The upper end of slot 72 is open and the abutment tab 73 is received by axial insertion. The distal end 74 of body portion 67 is closed and rounded with a hemispherical form. It is the closed, distal end 74 that is placed against the ground or against a weed or against a similar surface that provides an abutment. Having this abutment is important so that the dispensing tip 24 is not able to move axially when a dispensing stroke is initiated by the user by pushing down with the handle. When performing a dispensing stroke by pushing down on the handle, it will be noted that this action also pushes down on the container holder 23. Since the dispensing tip 24 is not able to move due to the abutment against the ground, or weed, or similar surface, the distance of separation shortens and the plunger mechanism within the product-dispensing container is activated by the inward axial movement of nozzle 37.

Referring now to FIGS. 16-19, child-resistant locking ring 25 includes, in addition to ratchet teeth 68 and abutment tab 73, a press-to-release tab 75 that includes the series of ratchet teeth 68, a raised wall channel 76, and marking indicia 77 indicating the turning directions for locking and unlocking.

In use, child-resistant locking ring 25 fits around the tubular sleeve portion 28 and beneath collar 56 so that the two series of ratchet teeth 57 and 68 can interfit and engage once the locking ring 25 is pushed axially upwardly. In order to maintain this upward position, the abutment tab 73 is used. With abutment tab 73 positioned so as to contact the upper edge 78 of open end 31, the product-dispensing apparatus 20 remains in a locked condition. The locking ring 25 is held in this position due to the abutment and the manner in which the ratchet teeth are engaged with each other. This configuration prevents any relative axial movement between the container holder 23 and the dispensing tip 24.

In order to unlock apparatus 20, the press-to-release tab 75 is pushed radially inwardly to release the ratchet tooth engagement. Concurrently with the ratchet tooth release, the locking ring 25 is turned so as to position the abutment tab 73 in alignment with tapered slot 72. An outwardly extending blade 73a as part of tab 73 is used to turn the locking ring 25. The alignment of tab 73 with slot 72 also separates the two series of ratchet teeth. Gravity is all that is required once the tab 75 is released. When the locking ring 25 drops downwardly, there is no possibility for rotation of ring 25 that might re-establish ratchet tooth engagement. This unlocked condition of apparatus 20 and of ring 25 is maintained so long as tab 73 is received by slot 72.

The reverse procedure for locking only requires raising the locking ring 25 and turning it so that the tip of abutment tab 73 contacts upper edge 78 at a location that brings the two series of ratchet teeth back into engagement. No manipulation of the press-to-release tab 75 is required since the angle or direction of the ratchet teeth ramp allows the locking ring 25 to be freely turned when moving from the unlocked to locked position. This is typical of ratchet tooth action and its unidirectional nature.

Each of the component parts of apparatus 20, as described herein, are unitary, molded plastic parts, designed to be light in weight and disposable, if a single-charge design is used relative to the style of product-dispensing container that is selected. It is envisioned that the product-dispensing apparatus 20 can be configured such that the product container is fixed with the apparatus 20 such that that particular product, such as a herbicide, is the only product to be dispensed by means of that apparatus. When the product is exhausted (i.e., the container is empty), the entire apparatus, including the product container, is discarded. The other option, as described herein, is to design the container holder so that the product container is removable and replaceable, allowing apparatus 20 to be reused for multiple cycles and to allow the apparatus to be used with different products.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A product-dispensing apparatus for manually dispensing a quantity of product from within a container that is carried by said product-dispensing apparatus, said product-dispensing apparatus comprising:
   a gripping member including a handle and a connecting member;
   a container holder connected with said gripping member and being constructed and arranged to receive said container, said container holder including a tubular sleeve portion;
   a dispensing tip connected with said container holder;
   a locking ring received by said container holder and cooperating with said dispensing tip for alternately configuring said product-dispensing apparatus in either a locked or unlocked condition, wherein while in said locked condition, said product-dispensing apparatus is not operable to cause product to be dispensed from said container; and
   wherein said connecting member is constructed and arranged to insert into said tubular sleeve portion.

2. The product-dispensing apparatus of claim 1 wherein said container holder defines an abutment shoulder adjacent said tubular sleeve portion.

3. The product-dispensing apparatus of claim 1 wherein said locking ring includes an abutment tab that determines the locked or unlocked condition of said product-dispensing apparatus depending on the position of said abutment tab.

4. The product-dispensing apparatus of claim 3 wherein said dispensing tip defines an open-ended slot.

5. The product-dispensing apparatus of claim 4 wherein said abutment tab is constructed and arranged to fit into said open-ended slot when said product-dispensing apparatus is in said unlocked condition.

6. A product-dispensing apparatus for manually dispensing a quantity of product from within a container that is carried by said product-dispensing apparatus, said product-dispensing apparatus comprising:
   a gripping member;
   a container holder connected with said gripping member and being constructed and arranged to receive said container, said container holder including an annular pocket constructed and arranged to receive a portion of said container;
   a dispensing tip connected with said container holder;
   a locking ring received by said container holder and cooperating with said dispensing tip for alternately configuring said product-dispensing apparatus in either a locked or unlocked condition, wherein while in said locked condition, said product-dispensing apparatus is not operable to cause product to be dispensed from said container; and
   wherein said dispensing tip includes an adapter portion that is axially aligned with said annular pocket.

7. The product-dispensing apparatus of claim 6 wherein said annular pocket is constructed and arranged to scenic said container by the use of a deflecting tip.

8. The product-dispensing apparatus of claim 7 wherein said deflecting tip is the radially innermost portion of a release member.

9. A product-dispensing apparatus for manually dispensing a quantity of product from within a container that is carried by said product-dispensing apparatus, said product-dispensing apparatus comprising:
   a gripping member;
   a container holder connected with said gripping member and being constructed and arranged to receive said container, said container holder including a tubular sleeve portion;
   a dispensing tip connected with said container holder, said dispensing tip including a tubular body portion that defines a slot;
   a locking ring received by said container holder and cooperating with said dispensing tip for alternately configuring said product-dispensing apparatus in either a locked or unlocked condition, wherein while in said locked condition, said product-dispensing apparatus is not operable to cause product to be dispensed from said container; and
   wherein said tubular sleeve portion includes a radially outwardly extending protrusion constructed and arranged to fit within said slot.

10. A product-dispensing apparatus for manually dispensing a quantity of product from within a container that is carried by said product-dispensing apparatus, said container including an axially movable dispensing nozzle, said product-dispensing apparatus comprising:
    a gripping member;
    a movable member connected to said gripping member, said movable member including a receiving pocket constructed and arranged to receive a portion of said container;
    a stationary member assembled to said movable member and including a nozzle-receiving adapter, wherein movement of said movable member toward said stationary member moves said nozzle for the dispensing of product from said container; and
    a locking ring received by said movable member and engaging said stationary member for configuring said product-dispensing apparatus in either a locked or unlocked condition.

11. The product-dispensing apparatus of claim 10 wherein said gripping member includes a handle and a connecting member.

12. The product-dispensing apparatus of claim 11 wherein said movable member includes a tubular sleeve portion.

13. The product-dispensing apparatus of claim 12 wherein the connecting member is constructed and arranged to insert into said tubular sleeve portion.

14. The product-dispensing apparatus of claim 13 wherein said movable member defines an abutment shoulder adjacent said tubular sleeve portion.

15. The product-dispensing apparatus of claim 10 wherein said movable member includes a tubular sleeve portion.

16. The product-dispensing apparatus of claim 15 wherein said stationary member includes a tubular body portion that defines a slot.

17. The product-dispensing apparatus of claim 16 wherein said tubular sleeve portion includes a radially outwardly extending protrusion constructed and arranged to fit within said slot.

18. The product-dispensing apparatus of claim 17 wherein said gripping member includes a handle and a connecting member.

19. The product-dispensing apparatus of claim 18 wherein said movable member includes a tubular sleeve portion.

20. The product-dispensing apparatus of claim 19 wherein the connecting member is constructed and arranged to insert into said tubular sleeve portion.

21. The product-dispensing apparatus of claim 20 wherein said movable member defines an abutment shoulder adjacent said tubular sleeve portion.

22. The product-dispensing apparatus of claim 10 wherein said locking ring includes an abutment tab that determines the locked or unlocked condition of said product-dispensing apparatus depending on the position of said abutment tab.

23. The product-dispensing apparatus of claim 22 wherein said stationary member defines an open-ended slot.

24. The product-dispensing apparatus of claim 23 wherein said abutment tab is constructed and arranged to fit into said open-ended slot when said product-dispensing apparatus is in said unlocked condition.

* * * * *

UNITED STATES PATENT AND TRADEMARK OFFICE
CERTIFICATE OF CORRECTION

PATENT NO. : 7,299,950 B2 Page 1 of 1
APPLICATION NO. : 10/934292
DATED : November 27, 2007
INVENTOR(S) : Richard A. Laveault et al.

It is certified that error appears in the above-identified patent and that said Letters Patent is hereby corrected as shown below:

Column 5,
    Line 5, replace "roamer" with -- foamer --.

Column 8,
    Line 4, replace "scenic" with -- secure --.

Signed and Sealed this

Third Day of June, 2008

JON W. DUDAS
*Director of the United States Patent and Trademark Office*